United States Patent [19]
Landguth et al.

[11] Patent Number: 5,862,343
[45] Date of Patent: Jan. 19, 1999

[54] CIRCUIT FOR LOGICAL STREAM SORTING AT CPU TRANSFER TIME DIVISION FOR MULTIPLEXED (TDM) INCLUDING BUS INTERFACE CIRCUITRY

[75] Inventors: Mark Landguth, La Jolla; Paul Cheng, San Jose, both of Calif.

[73] Assignee: National Semiconductor Corporation, Santa Clara, Calif.

[21] Appl. No.: 918,943

[22] Filed: Aug. 25, 1997

Related U.S. Application Data

[63] Continuation of Ser. No. 394,311, Feb. 21, 1995, abandoned, and a continuation-in-part of Ser. No. 386,969, Feb. 10, 1995, abandoned.

[51] Int. Cl.[6] .................................................... G06F 3/00
[52] U.S. Cl. .............................. 395/200.66; 395/200.68; 395/200.83; 370/324; 370/415; 370/416
[58] Field of Search ........................ 395/200.19, 200.17, 395/200.66, 200.68, 200.83; 370/324, 415, 416

[56] References Cited

U.S. PATENT DOCUMENTS

| | | | |
|---|---|---|---|
| 5,008,878 | 4/1991 | Ahmadi et al. | 370/60 |
| 5,355,449 | 10/1994 | Lung et al. | 395/150 |
| 5,361,261 | 11/1994 | Edem et al. | 370/85.3 |
| 5,367,522 | 11/1994 | Otani | 370/84 |
| 5,369,617 | 11/1994 | Munson | 365/219 |
| 5,404,446 | 4/1995 | Bowater et al. | 395/162 |
| 5,438,663 | 8/1995 | Matsumoto et al. | 395/162 |
| 5,448,560 | 9/1995 | Chen et al. | 370/84 |
| 5,517,617 | 5/1996 | Sathaye et al. | 395/162 |
| 5,526,344 | 6/1996 | Diaz et al. | 370/16 |
| 5,606,562 | 2/1997 | Landguth | 370/506 |

FOREIGN PATENT DOCUMENTS

| | | | |
|---|---|---|---|
| 33 46 806 A1 | 7/1985 | European Pat. Off. | H04L 5/22 |
| 0 365 693 A1 | 5/1990 | European Pat. Off. | H04Q 12/64 |
| 0 496 663 A3 | 7/1992 | European Pat. Off. | H04J 3/16 |
| 0 596 652 A1 | 5/1994 | European Pat. Off. | H04L 12/64 |

OTHER PUBLICATIONS

IBM Technical Disclosure Bulletin, "Adaptation and Multiplexing Format for High Performance Scanning Function", vol. 35, No. 3, Aug. 1992, pp. 166–168.

Technical Manual—CCITT, The International Telegraph and Telephone Consultative Committee, Line Transmission of Non–Telephone Signals, "Frame Structure for a 64 to 1920 kbits/s Channel in Audiovisual Teleservices", H.221, Geneva, 1990.

*Primary Examiner*—Larry D. Donaghue
*Assistant Examiner*—Dzung C. Nguyen
*Attorney, Agent, or Firm*—Limbach & Limbach L.L.P.

[57] ABSTRACT

A network-to-CPU interface circuit interfaces an isochronous physical layer to an ISA bus such that a host CPU connected to the ISA bus can communicate with the isochronous physical layer. Inbound B-channel interface circuity is connectable to receive, from the isochronous physical layer, an inbound data stream which includes a plurality of B-channels time division multiplexed into time division multiplexed (TDM) frames. The TDM frames have a predetermined format that defines at least one logical stream such that each logical stream comprises those B-channels that are time division multiplexed into corresponding predetermined locations within the TDM frames. An inbound buffer portion of a memory is provided to hold the received inbound data stream, and an outbound buffer portion of the memory is provided for holding an outbound data stream which, like the inbound data stream, includes a plurality of B-channels time division multiplexed into time division multiplexed (TDM) frames. ISA bus interface circuitry is provided for channeling a selected inbound logical stream from the inbound memory buffer to the host CPU, via the ISA bus, in response to a request from the host CPU. The ISA bus interface circuitry is also for receiving a data stream from the host CPU, via the ISA bus, and for channeling that received data stream, as an outbound logical stream, to the TDM frames in the outbound memory buffer according to the predetermined format. Outbound B-channel interface circuity is provided to transmit the outbound data stream from the outbound memory buffer to the isochronous physical layer.

16 Claims, 7 Drawing Sheets

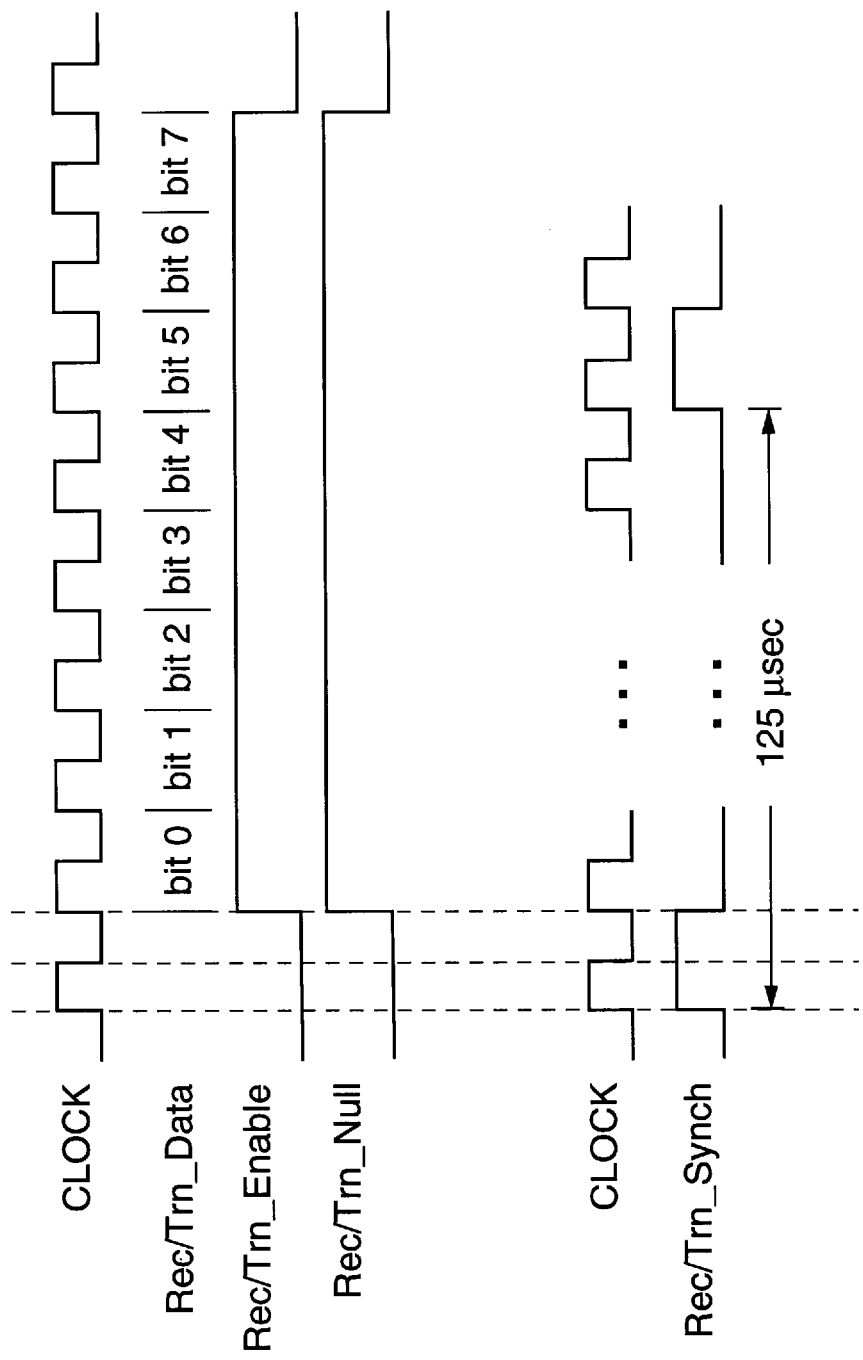

CIRCUIT FOR LOGICAL STREAM SORTING AT CPU TRANSFER TIME DIVISION FOR MULTIPLEXED (TDM) INCLUDING BUS INTERFACE CIRCUITRY

This is a contiuation and a continuation-in-part of application Ser. No. 08/386,969 (now abandoned), filed Feb. 10, 1995, (by Express Mail, bearing Mailing Label Number TB828187173US) by Mark A. Landguth, and entitled METHOD AND APPARATUS FOR TRANSMITTING DATA ISOCHRONOUSLY AT A RATE LESS THAN THE ISOCHRONOUS DATA RATE.

TECHNICAL FIELD OF THE INVENTION

The present invention relates to circuits for transferring logical streams between an isochronous physical layer and a CPU and, in particular, to a circuit which sorts the logical streams at CPU transfer time.

BACKGROUND OF THE INVENTION

Information may be transmitted isochronously over a Local Area Network ("LAN") or a Wide Area Network ("WAN"). FIG. 1 shows a system in which a computing node 42a is connected for audio, video, and data exchange (i.e., "customer information") over a WAN and with other, perhaps similar, computing nodes (e.g., node 42b). The computing node 42a is connected by an isochronous Ethernet serial physical layer link 47 to an isochronous-capable hub 40. Alternatively, the computing node 42 may be connected to a private branch exchange ("PBX"). The hub/PBX 40 is connected to a WAN, and backbone connections provide a connection from the hub/PBX 40 to other hubs/PBX's.

When information is transmitted isochronously, it is typically carried in one or more "B-channels". A B-channel, or "Bearer Channel", is a 64 kbits/sec channel that carries customer information such as voice-calls, circuit-switched data, or packet-switched data. A B-Channel has a constant, and thus predictable, bandwidth.

In a multi-channel isochronus network, one or more B-channel "logical streams" are time division multiplexed into a single higher speed channel to carry the customer information, but the information carried by one logical stream is typically unrelated to the information carried in another logical stream. For example, one logical stream may carry video information while another logical stream may carry audio information. From a network perspective, when transferring customer information to a CPU in a computing node, it is desirable to ignore the logical stream divisions and buffer the information in the high speed channel on a frame-by-frame basis. However, since the logical streams are unrelated, it is desirable from the CPU point of view to see these logical streams as being held in separate, stand-alone, buffers.

Conventional network/CPU buffering circuits support "N" logical streams by utilizing "N" different hardware components to perform the buffering (i.e., one hardware component per logical stream). One disadvantage of the conventional network/CPU buffering circuits is that to support more than "N" logical streams, more hardware components must be provided. Conversely, it is inefficient to provide more than "N" hardware components to support less than "N" logical streams.

SUMMARY OF THE INVENTION

The present invention is a network-to-CPU interface circuit that interfaces an isochronous physical layer to a computer bus such that a host CPU connected to the computer bus can communicate with the isochronous physical layer. Inbound B-channel interface circuity is connectable to receive, from the isochronous physical layer, an inbound data stream comprising a plurality of B-channels time division multiplexed (TDM) into frames. The TDM frames have a predetermined format that defines at least one logical stream such that each logical stream comprises those B-channels that are time division multiplexed into corresponding predetermined locations within the TDM frames.

Inbound memory means are provided to hold the received inbound data stream, and outbound memory means are provided for holding an outbound data stream comprising a plurality of B-channels time division multiplexed into time division multiplexed (TDM) frames.

Computer bus interface circuitry is provided for channeling a selected inbound logical stream from the inbound memory means to the host CPU, via the computer bus, in response to a request from the host CPU. The computer bus interface circuitry is also for transmitting a data stream from the host CPU, via the computer bus, and for channeling that transmitted data stream, as an outbound logical stream, to the TDM frames in the outbound memory means according to the predetermined format.

Outbound B-channel interface circuity is provided to transmit the outbound data stream from the outbound memory means to the isochronous physical layer.

A better understanding of the features and advantages of the invention will be obtained by reference to the following detailed description and accompanying drawings which set forth an illustrative embodiment in which the principles of the invention are utilized.

BRIEF DESCRIPTION OF THE FIGURES

FIG. 8 graphically illustrates the timing of control signals used to synchronize communication of data between the components of the computing node of FIG. 2.

DETAILED DESCRIPTION

Figure 1:
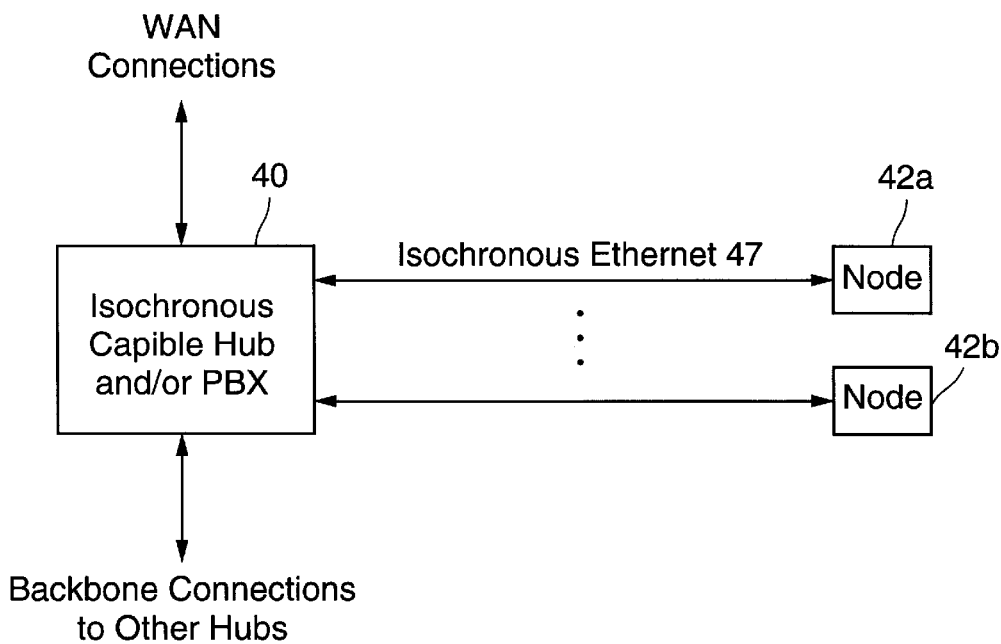
FIG. 1 illustrates, in block form, a system in which a computing node is connected isochronously to an isochronous capable hub and/or PBX, to other computing nodes via the hub, and to a WAN.
Figure 2:
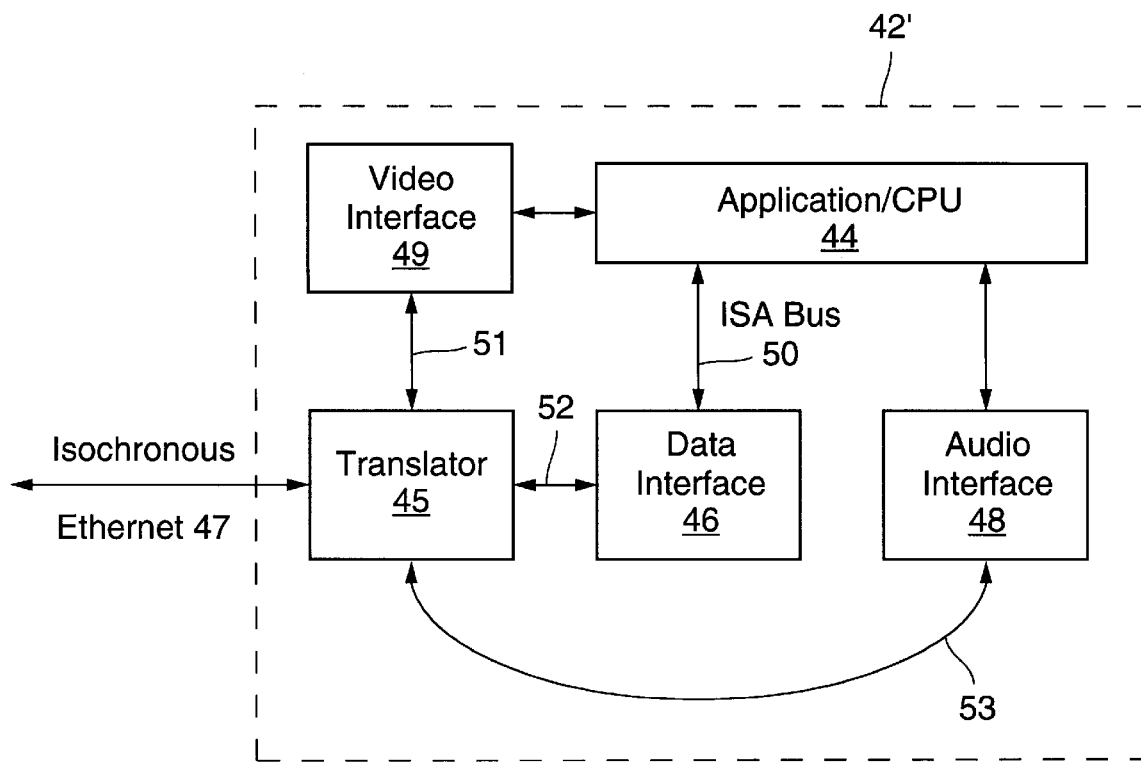
FIG. 2 illustrates, in block form, an embodiment of a computing node which transmits signals isochronously among the sub-systems of the node utilizing the method and apparatus of the present invention.

FIG. 2 illustrates, in block form, an embodiment of a computing node 42'. A user of node 42' may be, for example, one party to a conference call. Five subsystems (or components) within the computing node 42' handle the interactive communication. The five subsystems are:

1) a translator 45
2) a data interface 46

3) an audio interface 48
4) a video interface 49, and
5) application software 44, executing in a Windows environment on a CPU.

The translator 45, which is discussed in more detail below, provides an interface from the isochronous physical layer 47 to the other subsystems in the node. The data interface 46 provides an interface for transferring data (which may be, for example, data from a file or data that corresponds to mouse movements) to and from the application software 44. The audio interface 48 provides an interface for transferring audio data (which may be, for example, audio data to drive a speaker or audio data received from a microphone) to and from the application software 44. The video interface 49 provides an interface for transferring video data (for example, from a camera and to a display) to and from the application software 44.

Figure 3:
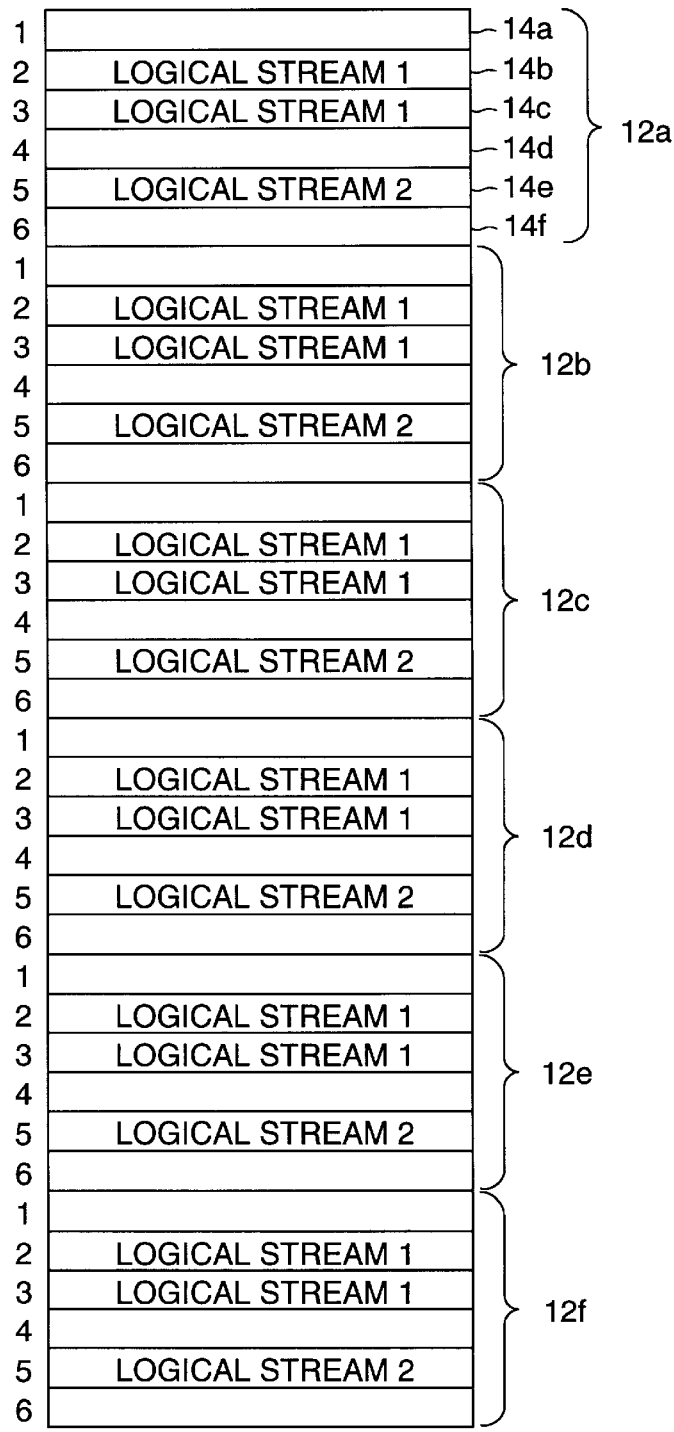
FIG. 3 illustrates an example of an intra-node transmission channel format.

An intra-node transmission channel, for communication between the subsystems of the node 42', is divided into time-division multiplexed ("TDM") frames for transfer of information among the components of the node 42'. FIG. 3 shows an example of such an intra-node transmission channel format 10, in which six TDM frames, 12a through 12f, are shown. Each TDM frame is divided into bytes (i.e., "B-channels"). Typically, each TDM frame would be divided into a large number of B-channels (e.g., ninety-six). For simplicity of explanation, the TDM frames of the intra-node transmission channel format 10 are shown as being divided into six B-channels each. For example, TDM frame 12a is shown as being divided into B-channels 14a through 14f.

Using an intra-node transmission channel format like the one shown in FIG. 3, a particular type of information (e.g., audio) is transferred within a "logical stream", which is one or more B-channels at predetermined locations within the TDM frames. For example, referring still to FIG. 3, a first logical stream, LOGICAL STREAM 1, is shown as occupying the locations 2 and 3 in the TDM frames, 14a through 14f (i.e., B-channels 14b and 14c in TDM frame 12a and the corresponding locations in TDM frames 12b through 12f). A second logical stream, LOGICAL STREAM 2, is shown as occupying location 5 in the TDM frames, 14a through 14f. The logical streams occupy integral numbers of B-channels.

Referring again to FIG. 2, the translator 45 performs two functions, link translation and compilation/dissemination. By link translation, it is meant that the translator 45 translates the isochronous Ethernet serial physical layer link 47 into identical intra-node physical links 41, 52, 53. The translator 45 may also receive information structured in an H.221 format and decodes and disseminates the TDM-framed data to the various "interface" components. Conversely, the translator 45 compiles and encodes information received from the "interface" sub-systems 46, 48, and 49 into an H.221 frame structure. The International Telegraph and Telephone Consultive Committee (CCITT) Recommendation H.221 provides a recommendation for the format of line transmission of non-telephone signals. In particular, H.221 recommends a standard frame structure for the transmission of one or more "B-channels ", for audio-visual services, in an overall transmission channel.

Figure 4:
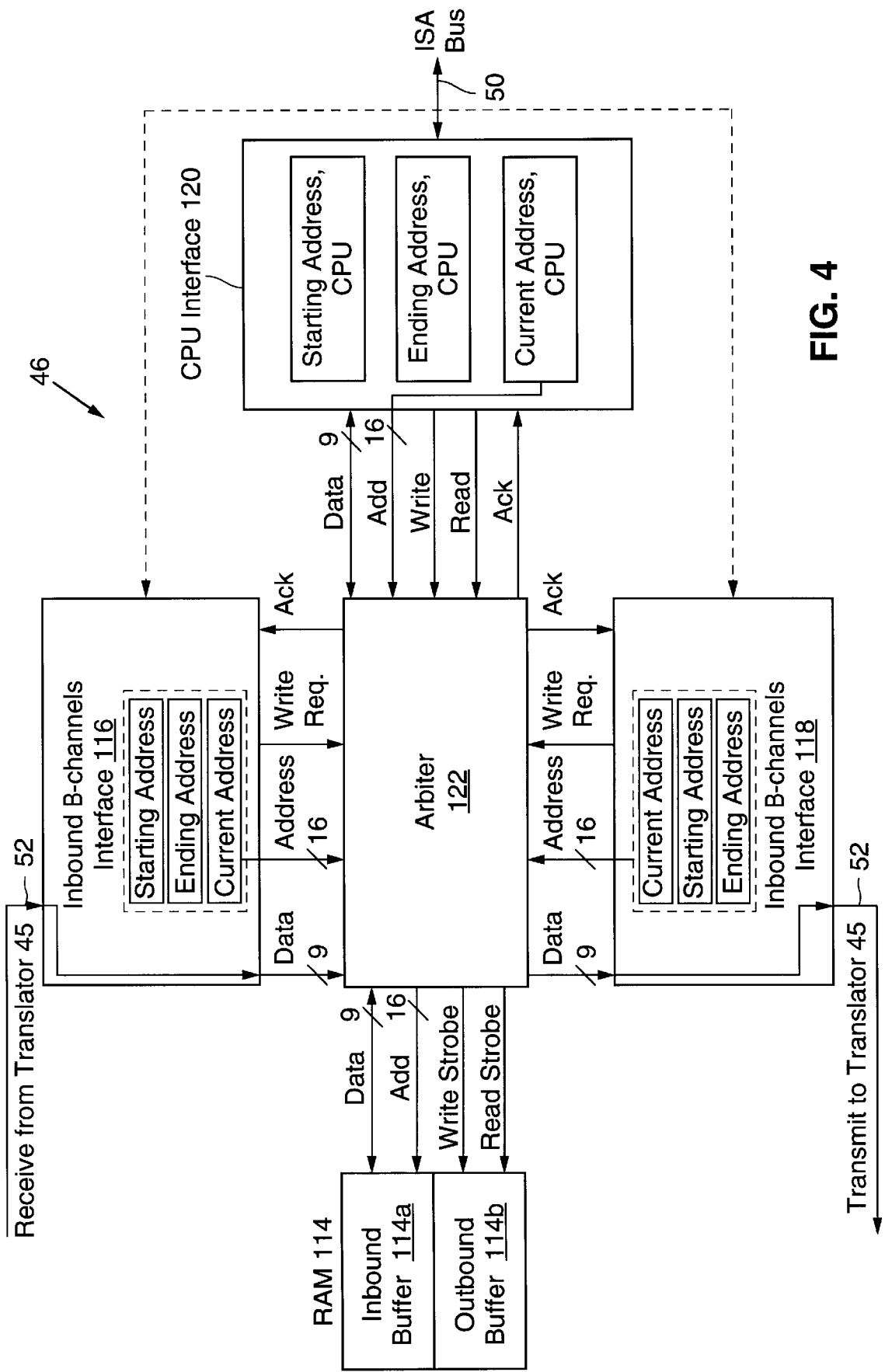
FIG. 4 illustrates, in block form, the data interface of the computing node of FIG. 2.

The data interface 46 is shown in block form in FIG. 4. The data interface 46 provides an interface between the ISA bus 50, to which the CPU 44 (not shown in FIG. 4) is connected, and the translator 45. The data interface 46 includes separate "interface" circuits (an inbound B-channels interface circuit 116, and outbound B-channels interface circuit 118, and a CPU interface circuit 120), an "Arbitrate" circuit 122, and a RAM 114. The three interface circuits all operate synchronously to a periodic CLOCK signal (For clarity, the CLOCK signal is not shown in FIG. 4). A raw inbound data stream, formatted in the intra-node TDM frame transmission format, is received from the translator and is written into an inbound buffer 114a in the RAM 114.

From the inbound buffer 114a, the CPU 44 can read any logical stream needed by the application program via the CPU interface 120. Similarly, the CPU 44 can write into an outbound buffer 114b in the RAM 114, via the CPU interface circuit 120, any one or more logical streams desired to be transmitted to the isochronous physical layer 47, for eventual transmission over the WAN. As is discussed in more detail below, an arbiter circuit 122 arbitrates access to the RAM 114 among the inbound B-channels interface circuit 116, the outbound B-channels interface circuit 118, and the CPU interface circuit 120.

Each interface circuit controls, independently of the other interface circuits, which locations in the RAM 114 it accesses. In particular, within each of the inbound and outbound B-channels interface circuits 118, 116, are provided inbound buffer address registers: a "starting" address register, an "ending" address register, and a "current" address register. The pairs of starting and ending address registers define the inbound 114a and outbound 114b buffer boundaries within the RAM 114. While the inbound 114a and outbound 114b buffers need not be defined to be the same size, each must be at least large enough to hold one TDM frame. The CPU 44 initializes the starting and ending address registers at, for example, start-up of the application program. In a particular embodiment, the address registers are mapped into the I/O space of the CPU 44 and are thus initialized by the CPU 44, via the ISA bus, by executing I/O instructions. The starting and ending address registers (and, thus, the sizes of the inbound 114a and outbound 114b buffers) typically are not changed by the application program after being initialized.

The current address registers, on the other hand, are dynamic, defining the currently active locations in the RAM 114. For example, each time a B-channel of the inbound data stream is written into inbound buffer 114a of the RAM 114, the value in the inbound current address register is updated to the next available inbound buffer 114a location. Similarly, each time a B-channel of the outbound data stream is read from outbound buffer 114b of the RAM 114, the value in the outbound current address register is updated to the next outbound buffer 114b location to be read. It should be noted that if operation of the inbound interface circuit and the outbound interface circuit are properly coordinated, a single address range in the RAM 114 may be used for both the inbound 114a and outbound 114b buffers.

A set of address registers are provided within an address generator in the CPU interface circuit 120. Since the CPU interface circuit both reads from the inbound buffer 114a of the RAM 114 and writes to the outbound buffer 114b of the RAM 114, the values in the CPU interface circuit 120 starting and ending address registers is reset before each time the CPU 44 accesses the RAM 114. The value in the CPU interface circuit 120 current address register is similarly reset.

The arbiter circuit 122 is now discussed in detail. During one period of the CLOCK signal, only one complete read or write operation can be made to the RAM 114. Thus, all accesses to the RAM 114 are channeled through the arbiter circuit 122. For example, to write into the RAM 114, the inbound B-channels interface circuit 116 provides the data to be written, via a "data" bus, to the arbiter circuit 122. The address at which the data is to be written is provided from the current address register, via an "address" bus, to the arbiter circuit 122. Finally, a "write request" line to the arbiter circuit 122 is asserted. The arbiter circuit 122 presents the data and the address to the RAM 114, and asserts the "write strobe" to the RAM to cause the data to be written at the requested address. The arbiter circuit 122 acknowledges a successful write to the inbound B-channels interface circuit 116 via an "ack" line. Then, the current address register is modified to have the value of the next available location to be written in the inbound buffer 114a in the RAM 114.

Similarly, to read data from the RAM 114, the outbound B-channels interface circuit 118 provides from the current address register to the arbiter circuit 122, via an "address" bus, the address from which the data is to be read, and asserts a "read request" line to the arbiter circuit 122. The arbiter circuit 122 presents the address to the RAM 114 and asserts the "read strobe" to the RAM to cause the data to be read from the requested address. The "ack" line to the outbound B-channels interface 118 is asserted, indicating that data read is on the "data" bus.

The CPU interface circuit 120, using starting address, ending address, and current address registers, writes data to the outbound buffer 114b of the RAM 114, and accesses data from the inbound buffer 114a of the RAM 114, in a similar fashion.

When more than one RAM 114 access is attempted at the same time, the arbiter circuit 122 gives the interface circuit with the highest priority access to the RAM 114. The arbiter circuit 122 rotates the priority of access at each period of the clock (e.g., goes from inbound B-channel interface circuit 116, to outbound B-channel interface circuit 118, to ISA bus 50, back to inbound B-channel interface circuit 116, etc.). Thus, aside from a possible access latency, occurrence of simultaneous memory access attempts are transparent to the interface circuits.

Figure 5:
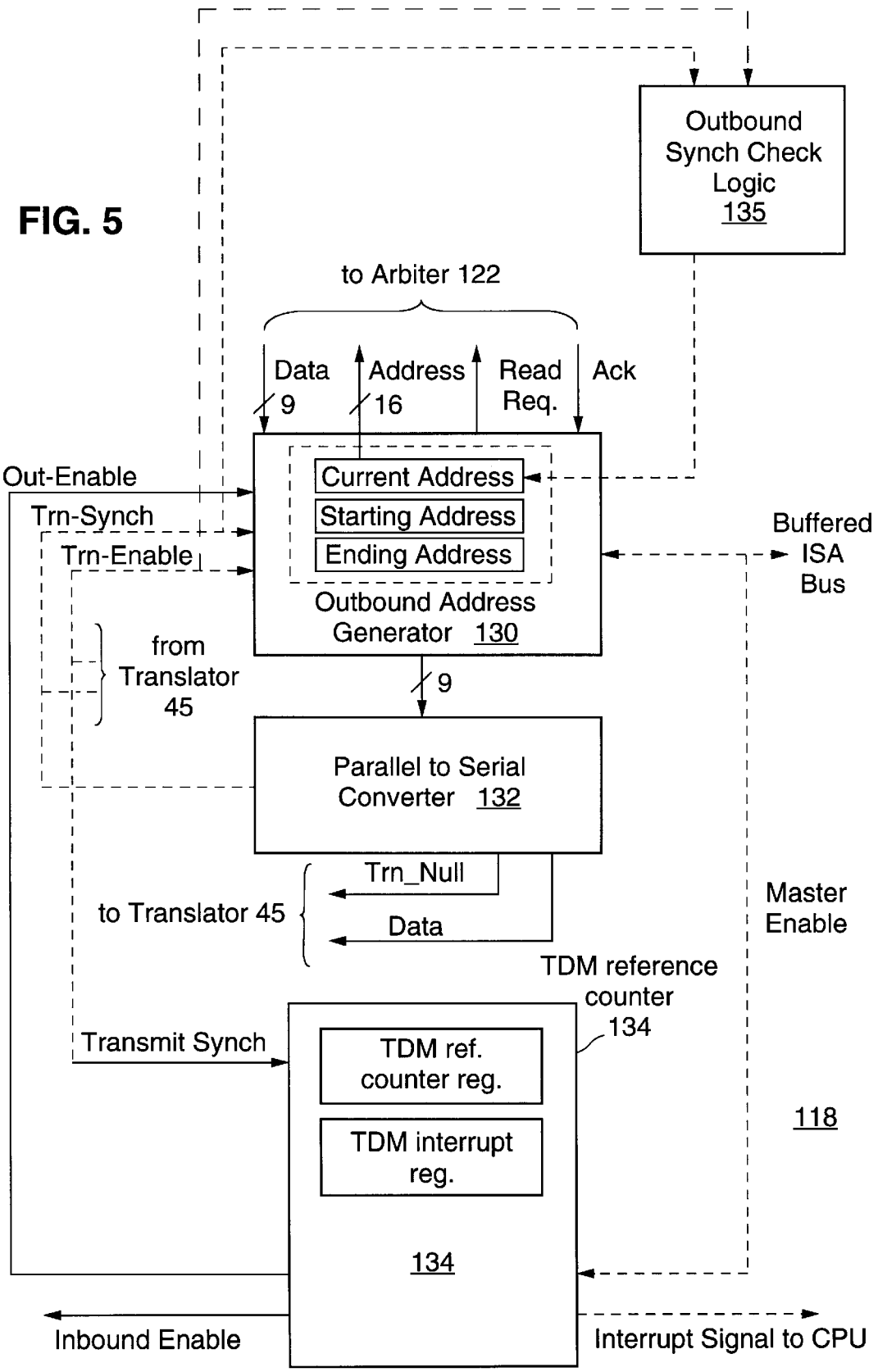
FIG. 5 schematically illustrates the outbound B-channels interface circuit of the computing node of FIG. 2.

FIG. 5 schematically illustrates the outbound B-channels interface circuit 118. Several control signals are used to synchronize operation of the outbound B-channels interface circuit 118. The timing of these control signals is discussed below, and the reader is referred to FIG. 8, where the timing of the control signals is graphically illustrated. An outbound address generator 130 comprises the address register group for controlling access to the outbound buffer in the RAM 114 by the outbound B-channels interface circuit 118. The outbound address generator 130 receives a transmit enable signal, Trn_Enable, from the translator 45. Responsive to assertion of Trn_Enable, the output address generator 130 provides an address of a location in the outbound buffer 114b in the RAM 114 from which to start reading a TDM frame (via the Arbiter circuit 122). The bytes of the TDM frame, read in parallel from the RAM 114, are converted to a serial data stream by a parallel to serial converter 132. The bits of the serial data stream are transmitted to the translator 45, responsive to Trn _Enable and synchronous to the master CLOCK. (See FIG. 8.) By checking the number of Trn_ Enable pulses are received for each Trn_Synch pulse received, an outbound synch check logic circuit 135 checks that the correct number bytes are transmitted for each outbound TDM frame. If not, the outbound synch check logic circuit 135 adjusts the current address pointer in an attempt to resynchronize outbound B-channel transmission. (It should be noted that the timing of the Trn_Enable and Trn_Synch signals are not necessarily related to the timing of the Rec_Enable and Rec_Sync signals.)

A TDM reference counter circuit 134 receives a transmit synchronization signal, Trn_Synch, from the translator 45, which indicates the commencement of transmission of a TDM frame by the translator 45. The TDM reference counter circuit 134 provides a time base to the circuitry of the network front end circuit 100. Specifically, the TDM reference counter 134 increments a value in a TDM reference counter register each time it receives Trn_Synch from the translator 45. Besides being used for time-tagging TDM's in the inbound and outbound data streams, the TDM reference counter circuit 134 may also be used to generate TDM-synchronized interrupts to the CPU 44. Typically, the TDM Reference Counter is used to schedule CPU device driver interrupt activation for communication between the CPU, via the CPU interface circuit 120, and the arbiter circuit 122. For a CPU device driver to schedule the next service point, the device driver determines the amount of time (the delta time) to the next service point and adds this time to the current value in the TDM reference counter register, and loads the sum into a TDM interrupt register. When the value in the TDM reference counter register reaches the value in the TDM interrupt register, the TDM reference counter circuit 134 generates an interrupt signal to the CPU.

Finally, the TDM reference counter circuit 134 also provides a master enable function, controlled by a master enable signal provided from the CPU 44, as an I/O mapped signal via the ISA Bus. When enabled by the master enable signal, and upon occurrence of the next Trn_Synch pulse, the TDM reference counter 134 provides an Inbound Enable signal to the inbound B-channels interface circuit 116 and an Outbound Enable signal to the outbound B-channels interface circuit 118, to enable operation of these circuits.

Figure 6:
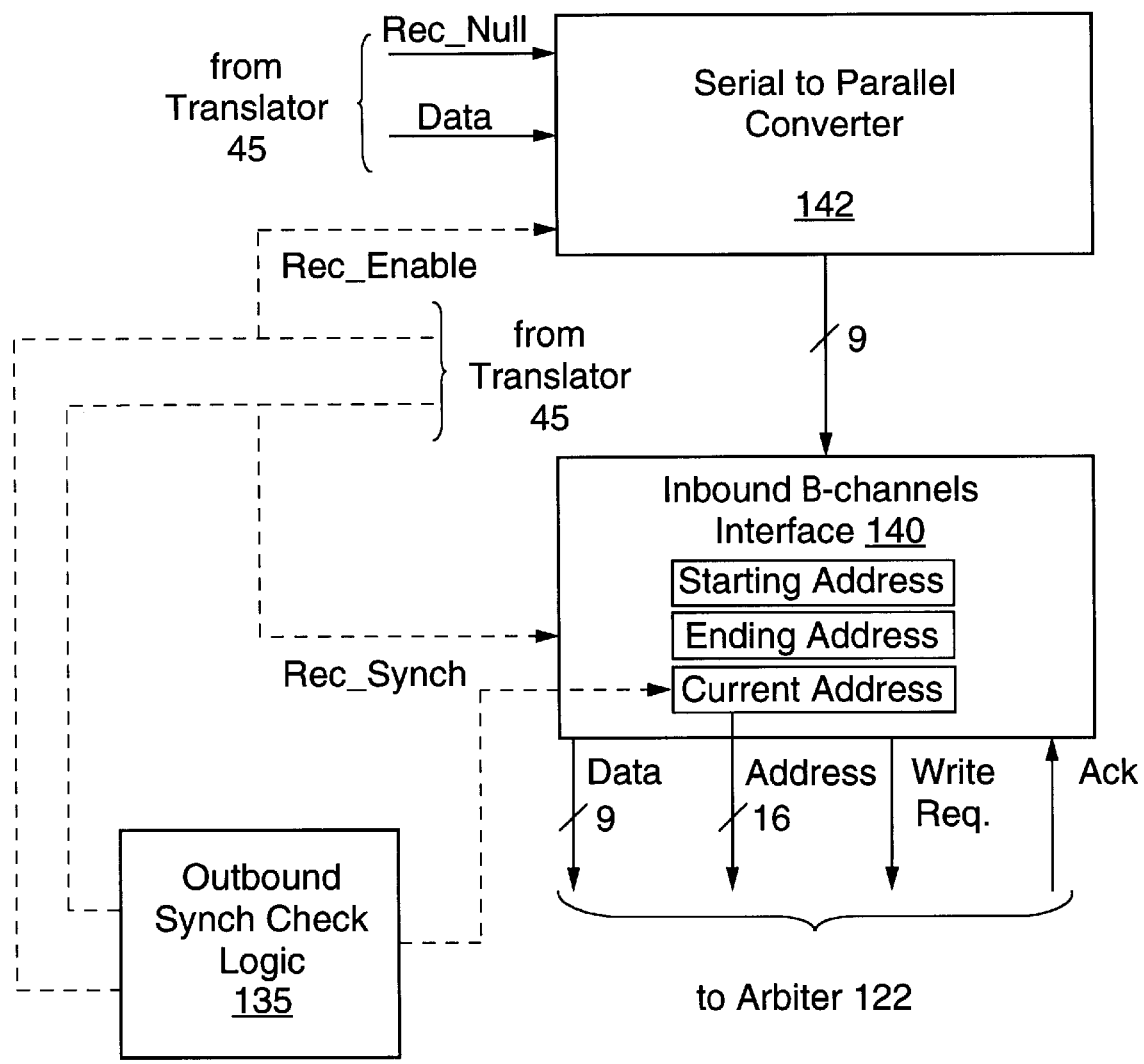
FIG. 6 schematically illustrates the inbound B-channels interface circuit of the computing node of FIG. 2.

FIG. 6 schematically illustrates the inbound B-channels interface circuit 116. A serial to parallel converter 142 receives a TDM frame serially from the translator 45, while a receive enable signal, Rec_Enable, from the translator 45 and synchronous to the master CLOCK. (See FIG. 8) The serial to parallel converter 142 converts the serial data stream into parallel data words.

An inbound address generator 140 comprises the address register group for controlling access to the inbound buffer 114a in the RAM 114 by the inbound B-channels interface circuit 116. The inbound address generator also receives the receive enable signal from the translator 45. The receive enable signal signals the inbound address generator 140 to provide an address of a location in the inbound buffer 114a in the RAM 114 to which to write (via the Arbiter circuit 122) the parallel data words. By checking the number of Rec_Enable pulses received for each Rec_Synch pulse received, an inbound synch check logic circuit 143 checks that the correct number of bytes are received for each inbound TDM frame. If not, the inbound synch check logic circuit 143 adjusts the current address pointer in an attempt to resynchronize inbound B-channel reception.

Figure 7:
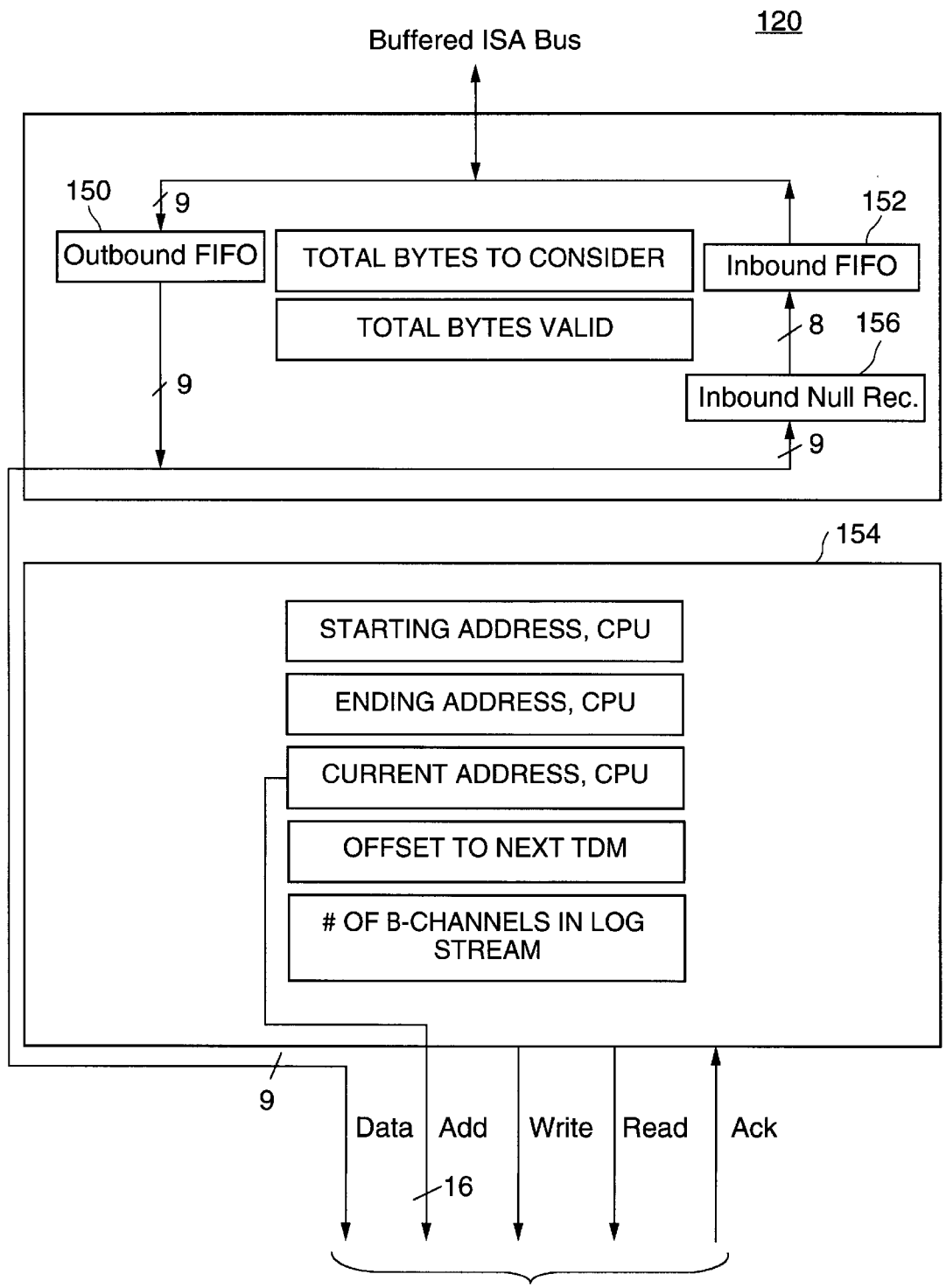
FIG. 7 schematically illustrates the CPU interface circuit of the computing node of FIG. 2.

FIG. 7 schematically illustrates the CPU interface circuit 120. An outbound FIFO 150 and an inbound FIFO 152 are each two bytes deep. An address generator 154 comprises the address register group for controlling access to the inbound 114a and outbound 114b buffers in the RAM 114. An "offset to next TDM frame" is set to equal the number of B-channels from the end of the portion of the logical stream in one TDM frame to the beginning of the portion of the logical stream in the next TDM frame.

To write a particular logical stream from the RAM 114, after setting the values of the starting and ending address registers in the address generator 154, the CPU 44 sets the current address register to the address of location in the outbound buffer 114b which is to hold the initial (first) B-Channel of the logical stream to be written; and the CPU 44 sets the "number of B-channels in logical stream" register to the size (number of B-Channels) of the logical stream.

The number of B-channels transferred from the CPU 44 to the outbound buffer 114b via the outbound FIFO 150 in the CPU interface circuit 120 is equal to the number in the "total bytes to consider" register. The CPU 44 initializes this register to hold the logical stream size multiplied by the number of TDM frames to process. For example, to write a logical stream which occupies six B-Channels per TDM frame, across 160 TDM frames, the CPU 44 would initialize the "total bytes to consider" register to 960. The CPU writes data to the outbound FIFO 150, and the address generator 154 generates the proper control signals to write the B-channels to the RAM 114, via the arbiter 122. Flow control is provided via the ISA Bus Ready line. Since no polling is required, a string I/O or other high speed transfer technique can be used.

For a read operation, the CPU 44 similarly sets the addresses, offset, number of B-channels and bytes to consider in the CPU interface circuit 120. The CPU interface circuit 120 begins the TDM frame read responsive to a read operation being indicated by the CPU 44. If the first B-channels from the TDM frame are not available when the read operation is indicated, then flow control is provided via the ISA Bus Ready line. As with writing to the RAM 114, string I/O or other high speed transfer technique may be used.

Fractional Logical Streams

As discussed above, the H.221 recommendation defines how an overall transmission channel may be divided into frames, with each frame containing eighty 8-bit octets. A sub-channel has ⅛ the capacity of a B-channel and, over the network, fractional B-channel capacities are carried in sub-channels of H.221-formatted frames. However, as discussed in the Background, it is desirable to connect the components of the node isochronously. Thus, across these isochronous connections, fractional capacities of substantive data bytes are carried in the intra-node transmission format as whole byte streams, with "null bytes" inserted to "fill out" the channel's capacity. For example, a ⅛ capacity channel has seven null bytes for every one substantive data byte. To indicate which bytes are null, each byte has associated with it a ninth "null flag" bit. Thus, each of the intra-node parallel links (in-bound B-channels interface 116 to arbiter 122; outbound B-channels interface 118 to arbiter 122; CPU interface circuit to arbiter 122; and arbiter 122 to RAM 114) are nine-bits wide.

Referring to FIGS. 6 and 8, null bytes are transmitted to the inbound B-channels interface circuit 116, from the translator 45, with the aid of a Rec_Null signal. In particular, if the Rec_Null signal is asserted as the serial to parallel converter 142 receives a data byte (as indicated by Rec_Enable being asserted), the serial to parallel converter 142 sets the ninth "null byte" flag in the data byte as it is being written into the inbound buffer 114a in the RAM 114. In this case, the 8-bit data portion of the received data byte is "don't care". Otherwise, if the Rec_Null signal is not asserted as the serial to parallel converter 142 receives a data byte (as indicated by Rec_Enable being asserted), the serial to parallel converter 142 clears the ninth "null byte" flag in the data byte as it is being written into the inbound buffer 114a in the RAM 114. In this case, the 8-bit data portion of the received data byte is a substantive data byte.

Similarly, referring to FIGS. 5 and 8, null bytes are transmitted from the outbound B-channels interface circuit 116, to the translator 45, with the aid of a Trn_Null signal. In particular, if the ninth "null byte" flag of a byte to be transmitted from the outbound buffer 114b is set, the parallel to serial converter 132 asserts the Trn_Null signal as it transmits the null data byte to the translator 45. The data byte serially transmitted to the translator 45 is "don't care". Otherwise, if the ninth "null byte" flag is not set, the parallel to serial converter deasserts Trn_Null as the parallel to serial converter 132 transmits a data byte (as indicated by Trn_Enable being asserted). In this case, the data byte serially transmitted to the translator is a substantive data byte.

Referring again to FIG. 7, an in-null processing circuit 156 within the CPU interface circuit 120 discards inbound null bytes read from the inbound buffer 114a so that the null bytes are never transferred to the CPU 44. Likewise, the CPU interface circuit 120 inserts null bytes into the outbound FIFO 150 so that null bytes (as indicated by the ninth "null" flag bit being set) are transferred to, and written into, the outbound buffer 114b. Thus, while the inbound B-channel transfer rate is a function of the source of the B-channel, the CPU 44 does have direct control over the outbound, effective, rate of substantive data transmission.

For example, for a case in which a logical stream of fractional B-channels is written from the CPU 44 to the RAM 114, via the CPU interface circuit 120 and the arbiter 122, the CPU 44 writes the complete B-channels, but some of the bytes of the B-channels are designated as being "null". The CPU may designate a particular byte as being null, for example, by outputting the byte from the CPU 44 at a particular I/O location different from the location at which a non-null byte is output. This causes the null flag bit associated with the byte to be set. Again, the null bytes have a "don't care" data value (and, in fact, the data value is indeterminate), but the CPU interface sets the ninth-bit null flag such that the byte transferred to, and written into, the RAM 114 is designated as null. Alternately, when substantive bytes are transferred to, and written into the RAM 114, the CPU interface circuit 120 clears the ninth-bit null flag such that the byte written into the RAM 114 is designated as substantive (i.e. non-null).

When a logical stream of fractional B-channels is transferred from the CPU 44 to the RAM 114, via the CPU interface 120 and the arbiter 122, the value in the "total bytes to consider" register is the total capacity of the B-channels in the requested logical stream, while the value in the "total bytes valid" register is the number of non-null bytes. As discussed above, the value in the "total bytes to consider" register is written by the CPU 44 before a CPU transfer operation. In particular, the value written would be calculated by multiplying the number of B-channels in the logical stream by the number of TDM frames to transfer. The value in the "total bytes valid" register is established by the CPU interface 120 during a CPU transfer operation.

For a read operation, the CPU also writes a value into the "total bytes to consider" register that is the total capacity of the B-channels in the to-be transferred logical stream. However, the "In Null Processing" circuit in the CPU interface 120 discards the null bytes before passing them to the inbound FIFO. After the transfer, the value in the "total bytes valid" register indicates the total number of non-null bytes transferred. The CPU 44 then discards the last "total bytes to consider" minus "total bytes valid" which it read from the CPU interface 120.

If the CPU 44 continues to read after all of the valid bytes have been transferred, and even after the number of bytes to consider has been exhausted, then the CPU interface passes indeterminate data to the CPU, but the ISA bus will not hang. Likewise, if the CPU 44 continues to write even after the number of bytes to consider has been exhausted, then the extra data is discarded, but the ISA bus will not hang.

To setup a fractional out-bound rate, it must first be determined what is the total capacity of the logical stream in the H.221-formatted frame. (It simplifies the process of adding capacities to employ a common denominator). The following three examples illustrate the algorithm for determining the total capacity of three different logical streams in an H.221-formatted frame:

1. Two B-Channel call with FAS/BAS on both channels with 16 kbit/Sec audio. The total video capacity is $((2*(1/40))+((5+7)*(5/40)))=68/40$ or 1.7 B-Channels.
2. Six B-Channel call with FAS/BAS on all channels and 56 kbit/Sec audio. Note that the Service Channel in the initial B-Channel is used for video. The total video capacity is $((6*(1/40))+(5*7*(5/40)))=199/40$ or 4.975 B-Channels.
3. H0 call with 56 kbit/Sec audio and Low Speed Data (LSD) in the Service Channel. The total data channel capacity is $4/40$ or 0.1 B-Channels.

Once the out-bound rate is known, it can be determined which bytes are to be indicated as "null". Now, an algorithm is presented which may be used to determine which bytes of the logical stream are to be indicated as null. The algorithm employs a set of "C" code register variables. Determining which bytes are to be null is basically an interpolation problem. For example, in computer graphics, interpolation is used to determine which pixels on the display to illuminate to display a smooth line. The Bresenham algorithm, used to solve the smooth line problem, is also used by the CPU to determine which of the transferred bytes are to be indicated as null. It is important to "smooth out" the insertion of null bytes in the logical stream in order to minimize latency and required buffering in the translator 45. The Bresenham algorithm is particularly useful in this application because it is not subject to rounding errors. Rounding errors cannot be tolerated because the translator 45 compilation must result in an exact multiple of B-channels.

It should be noted that the rates in the three examples are first expressed as a ratio: $68/40$, $199/40$, and $4/40$. To execute the algorithm, the rate ratio is designated as "X/Y" and the out-bound null registers are set up as follows:

1. Determine the total number of whole B-Channels needed. BChanNum=X/Y. If ((BChanNum*Y)<X) BChanNum++.
2. Make Y>=X. Y=BChanNum*Y.
3. Setup Bresenham: a) Error=2*X, b) Minor=2*X−2*Y, c) Major=2*X. Note that Major is always positive and Minor is zero or negative.

When X/Y is a whole number, operation falls back to the whole B-Channel case because "Minor" is zero and data values are always written. For each out-bound buffer write, do the following:

if Error>0
{
Output data value.
Error=Error+Minor.
}
else
{
Output value and indicate as null.
Error=Error+Major
}

It should be understood that various alternatives to the embodiments of the invention described herein may be employed in practicing the invention. It is intended that the following claims define the scope of the invention and that methods and apparatus within the scope of these claims and their equivalents be covered thereby.

What is claimed is:

1. An network-to-CPU interface circuit that interfaces an isochronous physical layer to an computer bus such that a host CPU connected to the computer bus can communicate with the isochronous physical layer, the network-to-CPU interface circuit comprising:

inbound B-channel interface circuity connectable to receive, from the isochronous physical layer, an inbound data stream comprising a plurality of B-channels time division multiplexed into time division multiplexed (TDM) frames, the TDM frames having a predetermined format defining at least one logical stream such that each logical stream comprises those B-channels that are time division multiplexed into corresponding predetermined locations within the TDM frames;

inbound memory means for holding the received inbound data stream;

outbound memory means for holding an outbound data stream comprising a plurality of B-channels time division multiplexed into time division multiplexed (TDM) frames;

computer bus interface circuitry for channeling a selected inbound logical stream from the inbound memory means to the host CPU, via the computer bus, in response to a request from the host CPU, and for receiving a data stream from the host CPU, via the computer bus, and for channeling that received data stream, as an outbound logical stream, for storage in the TDM frames in the outbound memory means according to the predetermined format;

outbound B-channel interface circuity to transmit the outbound data stream from the outbound memory means to the isochronous physical layer.

2. The network-to-CPU interface circuit of claim 1, wherein the first memory means and the second memory means exist within a single addressable memory space, and further comprising arbitration means for arbitrating access to the memory space among the computer bus interface circuitry, the inbound B-channel interface circuitry, and the outbound B-channel interface circuitry.

3. The network-to-CPU interface circuit of claim 2, wherein each of the computer bus interface circuitry, the inbound B-channel interface circuitry, and the outbound B-channel interface circuitry include address generator means for generating an address of a location in the memory space for memory access.

4. The network-to-CPU interface circuit of claim 1, and further comprising means for receiving a TDM synch signal, wherein the inbound B-channel interface circuitry receives the inbound data stream one TDM frame at a time synchronous with the TDM synch signal and the outbound B-channel interface circuitry transmits the outbound logical stream one TDM frame at a time synchronous with the TDM synch signal.

5. The network-to-CPU interface circuit of claim 1, wherein the computer bus interface circuitry includes null detecting means for detecting whether one or more B-channels of the selected inbound logical stream is indicated as "null", wherein the inbound computer bus interface circuitry channels only selected B-channels from the inbound memory means to the host CPU in response to a result of the detection.

6. The network-to-CPU interface circuit of claim 1, wherein the computer bus interface circuitry includes null indicating means for indicating a portion of the B-channels of the outbound logical stream as "null".

7. The network-to-CPU interface circuit of claim 6, wherein the B-channels are each represented by an eight bit signal and wherein an additional bit associated with each B-channel indicates whether a B-channel is "null".

8. An inbound interface circuit that interfaces an isochronous physical layer to an computer bus such that a host CPU connected to the computer bus can communicate with the isochronous physical layer, the inbound interface circuit comprising:

inbound B-channel interface circuity connectable to receive an inbound data stream comprising a plurality of B-channels time division multiplexed (TDM) into frames, the TDM frames having a predetermined format defining at least one logical stream such that each logical stream comprises those B-channels that are time division multiplexed into corresponding predetermined locations within the TDM frames;

memory means for holding the received inbound data stream; and computer bus interface circuitry connectable to receive a request from the host CPU for a selected logical stream and to channel the selected logical stream from the memory means to the host CPU via the computer bus.

9. The inbound interface circuit of claim 8, wherein the computer bus interface circuitry includes detecting means for detecting whether one or more B-channels of the selected logical stream is indicated as "null", wherein the computer bus interface circuitry channels only selected B-channels from the memory means to the host CPU in response to a result of the detection.

10. The inbound interface circuit of claim 9, wherein the B-channels are each represented by eight bits and wherein an additional bit associated with each B-channel indicates whether the B-channel is "null".

11. The inbound interface circuit of claim 9, wherein the computer bus interface circuitry selects for channelling to the CPU only those B-channels not detected to be indicated as "null" by the detecting means.

12. The inbound interface circuit of claim 8, wherein the inbound B-channel interface circuitry includes means for receiving a TDM synch signal, wherein the inbound B-channel interface circuitry receives the inbound data stream one TDM frame at a time, responsive to the TDM synch signal.

13. An outbound interface circuit that interfaces an isochronous physical layer to an computer bus such that a host CPU connected to the computer bus can communicate with the isochronous physical layer, the circuit comprising:

outbound B-channel interface circuity connectable to transmit an outbound data stream comprising a plurality of B-channels time division multiplexed (TDM) into frames, the TDM frames having a predetermined format defining at least one logical stream such that each logical stream comprises those B-channels that are time division multiplexed into corresponding predetermined locations within the TDM frames;

memory means for holding the outbound data stream and for providing the outbound data stream to the outbound B-channel interface circuitry; and computer bus interface circuitry to receive a data stream from the host CPU via the computer bus and to channel that data stream, as a selected one of the logical streams, to the TDM frames in the memory means according to the predetermined format.

14. The outbound interface circuit of claim 13, wherein the computer bus interface circuitry includes null indicating means for indicating a portion of the B-channels of the selected logical stream channeled to the TDM frames in the memory as "null".

15. The outbound interface circuit of claim 14, wherein the B-channels are each represented by eight bits and wherein an additional bit associated with each B-channel indicates whether the B-channel is "null".

16. The outbound interface circuit of claim 13 wherein the outbound B-channel interface circuitry includes receiving means for receiving an outbound TDM synch signal, wherein the outbound B-channel interface circuitry transmits the selected logical stream one TDM frame at a time synchronous with the outbound TDM synch signal.

* * * * *

UNITED STATES PATENT AND TRADEMARK OFFICE
CERTIFICATE OF CORRECTION

PATENT NO. : 5,862,343
DATED : January 19, 1999
INVENTOR(S) : Mark Landguth et al.

It is certified that error appears in the above-identified patent and that said Letters Patent is hereby corrected as shown below:

In Col. 10, line 6, after "1." delete "An" and replace with --A--.

In Col. 10, line 7, delete "an" and replace with --a--.

In Col. 10, line 11, delete "circuity" and replace with --circuitry--.

In Col. 10, line 36, delete "circuity" and replace with --circuitry--.

In Col. 11, line 10, delete "an" and replace with --a--.

In Col. 11, line 14, delete "circuity" and replace with --circuitry--.

In Col. 12, line 8, delete "an" and replace with --a--.

In Col. 12, line 11, delete "circuity" and replace with --circuitry--.

Signed and Sealed this

Twenty-second Day of June, 1999

Attest:

Q. TODD DICKINSON

*Attesting Officer*   *Acting Commissioner of Patents and Trademarks*